United States Patent [19]

Blumenkranz

[11] 3,936,081
[45] Feb. 3, 1976

[54] PIPE JOINT AND METHOD OF MAKING SAME

[75] Inventor: James J. Blumenkranz, Hollywood, Calif.

[73] Assignee: R & G Sloane Manufacturing Co., Inc., Woodland Hills, Calif.

[22] Filed: Feb. 27, 1974

[21] Appl. No.: 446,518

[52] U.S. Cl. ............... 285/231; 264/269; 285/345; 285/423
[51] Int. Cl.² ............................................ F16L 21/02
[58] Field of Search .......... 285/230, 231, 379, 374, 285/345, 350, 328, 423; 277/164, 176; 264/249; 29/451

[56] References Cited
UNITED STATES PATENTS

| | | | |
|---|---|---|---|
| 1,595,310 | 8/1926 | Mueller et al. | 285/328 X |
| 2,398,399 | 4/1946 | Alexander | 285/231 |
| 2,427,787 | 9/1947 | Hunter | 277/171 |
| 2,477,533 | 7/1949 | Whiting | 277/170 |
| 2,690,360 | 9/1954 | Young | 277/169 X |
| 2,739,855 | 3/1956 | Bruning | 277/188 |
| 2,805,511 | 9/1957 | Widmer | 285/369 X |
| 3,095,218 | 6/1963 | Elder et al. | 285/8 |
| 3,100,656 | 8/1963 | MacArthur | 285/350 X |
| 3,265,410 | 8/1966 | Lopung | 285/110 |
| 3,455,566 | 7/1964 | Hull et al. | 277/176 |
| 3,479,063 | 11/1969 | Rover | 285/379 X |
| 3,544,119 | 12/1970 | Glover | 285/345 |
| 3,807,027 | 4/1974 | Heisler | 285/231 |
| 3,827,734 | 8/1974 | Brown | 285/379 |

FOREIGN PATENTS OR APPLICATIONS

| | | | |
|---|---|---|---|
| 1,303,912 | 8/1962 | France | 285/374 |
| 1,175,503 | 12/1969 | United Kingdom | 285/379 |
| 1,183,881 | 3/1970 | United Kingdom | 285/379 |

*Primary Examiner*—Dave W. Arola
*Attorney, Agent, or Firm*—Finnegan, Henderson, Farabow & Garrett

[57] ABSTRACT

A pipe joint and method of making a pipe joint are disclosed, the pipe joint being suitable for formation on a pipe fitting and a pipe and comprising an enlarged annular socket, a first lip projecting toward the open end of the socket cooperating with a second lip formed on an annular retaining ring to hold an annular seal ring therebetween, the retaining ring being locked in place by deforming the outer end of the pipe member radially inwardly.

8 Claims, 5 Drawing Figures

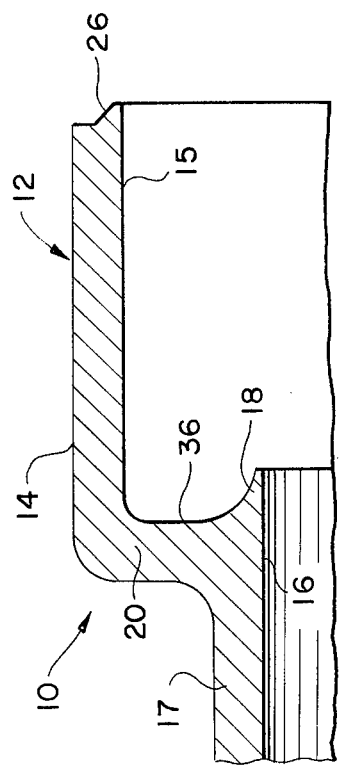
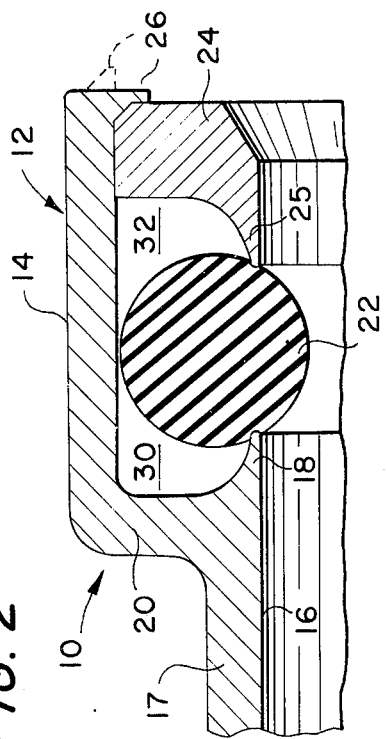
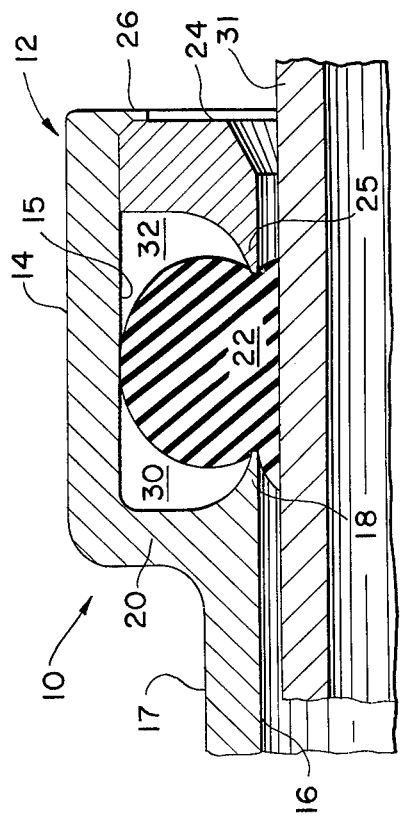
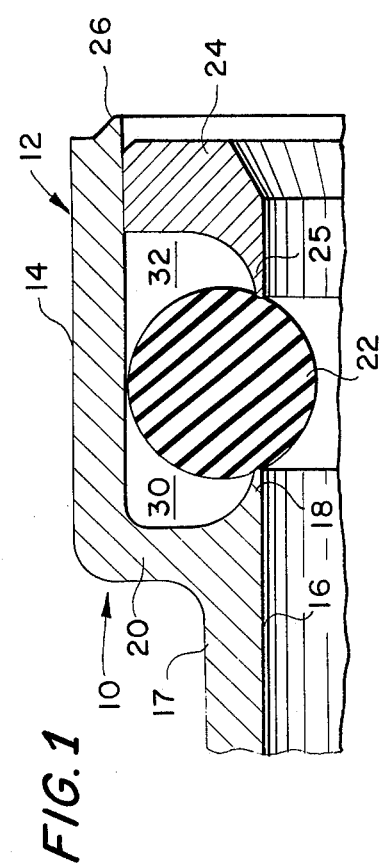
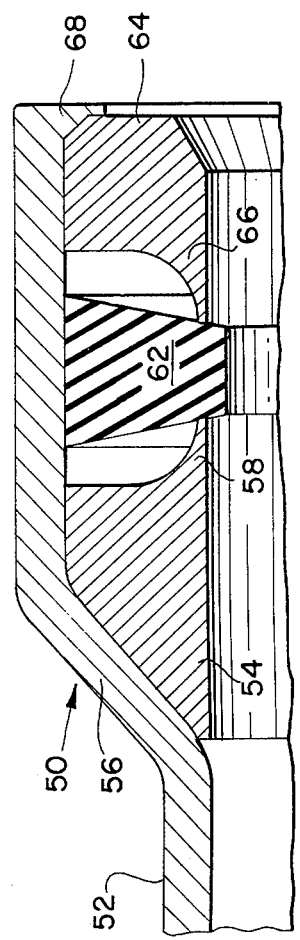
FIG. 1
FIG. 2
FIG. 3
FIG. 4
FIG. 5

3,936,081

PIPE JOINT AND METHOD OF MAKING SAME

BACKGROUND OF THE INVENTION

This invention relates to pipe couplings and, more particularly, to an improved method for forming a low pressure pipe coupling and the method of making the improved pipe joint.

There is a continued desire and effort to reduce the cost and increase the reliability of pipe joints. Since pipes are joined to other pipes and to pipe fittings, such as elbows, tees, etc., it is both practically and economically desirable to utilize a joint of common physical configuration for both pipe-to-pipe and pipe-to-fitting joints. Many joint failures presently occur due to two primary reasons. In an improperly designed joint employing an elastomeric seal ring, the seal ring often becomes dislodged during insertion of the pipe end into the female member of the joint or socket. To prevent this dislodgement, positive means must be employed to hold the seal ring in place. One common positive means presently employed is to provide a recess or groove into which the seal ring is fitted; however, these grooves are usually formed by machining or through the use of heat forming. Both of these methods increase the manufacturing costs and tooling costs. A second cause for joint failure, particularly in certain environments such as laying sewer pipes in earthen trenches, is the relatively common occurrence of a rigid member, (for example, sand or pebbles) becoming lodged between the elastomeric seal and the outer shell of the socket creating open leakage paths around the seal ring.

Accordingly, it is an objective of this invention to provide a new and improved pipe joint suitable for use on the end of a pipe for a pipe-to-pipe joint and on a pipe fitting for a pipe-to-fitting joint and which can be economically manufactured and assembled.

It is a further objective of this invention to provide an improved and relatively inexpensive method for making a pipe joint which provides a reliable low pressure seal and which is suitable for use in forming a joint on a pipe end or on a fitting.

Additional objectives and advantages of the invention will be set forth in part in the description which follows, and in part will be obvious from the description, or may be learned by practice of the invention. The objectives and advantages of the invention may be realized and attained by means of the instrumentalities and combinations particularly pointed out in the appended claims.

BRIEF DESCRIPTION OF THE INVENTION

To achieve the foregoing objectives and in accordance with the purpose of the invention, as embodied and broadly described herein, the pipe joint of this invention comprises a pipe fitting member having an enlarged annular socket, a first lip spaced radially inwardly from the interior surface of the socket and extending toward an open end of the socket, an annular retaining ring within the socket and having a second lip extending toward and spaced from the first lip, the second lip being spaced radially from the interior surface of the socket, an annular seal ring between the first and second lips and in contact therewith, the seal ring cross-sectional dimension at the mean diameter of the seal ring being larger than the spacing between the first and second lips and being located radially between the interior surface of the socket and the first and second lips, and means for locking the retaining ring within the socket. Preferably, the retaining ring locking means is a third lip formed on the pipe fitting member and extending generally radially inwardly.

The invention also comprises the method of making a pipe joint comprising the steps of forming an enlarged cylindrical socket at the end of a pipe body, providing a first lip spaced radially inwardly from the socket and axially from the open end of the pipe body and projecting toward the open end forming an annular groove, inserting an annular seal ring into the cylindrical socket in contact with the first lip, the mean diameter of the seal ring being located radially outwardly from the first lip, inserting an annular retaining ring having a second lip spaced radially inwardly from the outer surface thereof and extending transversely therefrom so that the second lip contacts the seal ring radially inwardly from the mean diameter of the seal ring, and locking the seal ring within the cylindrical socket, such as by deforming a portion of the cylindrical section adjacent to the open end radially inwardly.

BRIEF DESCRIPTION OF THE DRAWINGS

The invention consists of the novel parts, constructions, arrangements, combinations and improvements shown and described. The accompanying drawing, which is incorporated in and constitutes a part of the specification, illustrates one embodiment of this invention and, together with the description, serves to explain the principles of the invention.

In the drawing:

FIG. 1 is a partial sectional view of a pipe fitting having a pipe joint formed in accordance with this invention;

FIG. 2 is a sectional view of the pipe fitting of FIG. 1 illustrating the first step in the method of forming a pipe joint in accordance with this invention;

FIG. 3 is a sectional view of the pipe fitting of FIG. 2 illustrating partial completion of the pipe joint:

FIG. 4 is a sectional view of the pipe fitting of FIG. 2 illustrating the completed pipe joint; and FIG. 5 is a partial sectional view of a pipe having a pipe joint formed at one end thereof in accordance with the second embodiment of this invention.

DETAILED DESCRIPTION OF A PIPE FITTING SOCKET

Reference will now be made in detail to the present preferred embodiment of the invention, an example of which is illustrated in FIGS. 1 through 4.

In accordance with the invention, a pipe fitting 10 is provided with a pipe joint for sealingly receiving a pipe, the pipe joint being formed by a socket having an annular elastomeric seal ring and means for locking the seal ring within the socket to prevent dislodgement thereof. As here embodied, a socket or female member 12 is formed at the end of a fitting 10 and includes an annular wall 14 having a cylindrical bore 15 of larger inside diameter than the bore 16 of the fitting arm 17 on which it is formed. The socket 12 is provided with a forwardly extending lip 18 projecting toward the open end of the socket from the generally radial wall 20 joining the annular wall 14 of the socket 12 with the fitting arm 17.

Further in accordance with this invention, an annular elastomeric seal ring 22 is mounted in the socket 12 in contact with the forwardly extending lip 18 and is held in place by an annular retaining ring 24 having a lip 25 projecting toward the lip 18. The retaining ring 24 also contacts the seal 22. Both the forwardly extending lip 18 and the retaining ring lip 25 contact the annular seal ring 22 below the mean diameter of the seal ring in order to insure that the seal ring remains in place within the socket 12 and does not become dislodged when a pipe to be joined to the fitting 10 is inserted through the end of the fitting. The retaining ring 24 is locked in position within the socket 12 by a radially inwardly projecting external lip 26 formed at the open end of the fitting 10.

As can be seen in FIG. 1 the lip 18, radially directed wall 20, the cylindrical wall 14 of the socket 12 and the annular seal ring 22 together define a clearance 30 into which the seal ring 22 expands when the seal ring is compressed radially by the insertion of a pipe 31 into the socket 12. Similarly, a clearance 32 is defined by the annular retaining ring 24, the wall 14 and the seal ring 22. The continuous positive contact of the lips 18 and 25 with the annular seal ring 22 eliminates any path through which dirt particles might enter the socket 12 and lodge behind the seal ring 22 to establish a leakage path.

The pipe joint of this invention facilitates economical tooling and manufacturing. In accordance with this invention, with reference to FIGS. 2, 3 and 4, a plastic pipe fitting 10 having the female joint member or socket 12 of the invention may be initially formed by injection molding. The cylindrical bore 15 permits linear withdrawal of the core of an injection mold. Furthermore, an annular recess or groove 36 may also be molded directly into the end wall 20 of the socket 12 to form the forwardly protruding lip 18 and to provide the clearance 30 for facilitating the lateral expansion of the annular seal ring 22 as described above. The socket may also be molded with a forwardly projecting external lip 26 as can be seen in FIG. 2. This simplified molding with a linearly withdrawable core eliminates the need to machine or otherwise form seal ring receiving grooves.

Turning now to FIG. 3, the seal ring 22 is shown as having a simple round cross-section which contributes to the reduced manufacturing costs. The seal ring 22 is inserted in the socket 12 until it contacts the lip 18 and a moldable annular ring 24 is easily placed into the socket 12 through the open end. The protruding lip of the retaining ring 24 contacts the seal ring 22. The lips 18 and 24 contact the seal ring below the seal ring's mean diameter thereby making the seal ring captive in its finally assembled position.

The external lip 26 on the socket is then deformed, such as by cold rolling, to a radially inwardly directed position as can be seen in FIG. 4 wherein it prevents removal of the retaining ring 24 and seal ring 22. Alternatively, in place of deforming the external lip 26, the retaining ring can be locked in position by other suitable means, such as thermal or solvent welding in the case of plastic pipe. It should be noted that in its fully assembled position the annular seal ring 22 projects radially inwardly beyond the cylindrical wall defining the bore 16 of the fitting 10 and beyond the retaining ring 24 in order to forcibly contact the pipe 31 which is inserted within the socket 12. However, because the annular seal ring is trapped in place by the lips 18 and 25, the pressure applied by the inserted pipe 31 will not dislodge the seal ring 22 and, therefore, will not result in a defective joint.

Pipe-to-Pipe Joint

Referring now to FIG. 5, in accordance with the invention a pipe joint may be formed at the end of a pipe and provide the same reliable seal as described above with respect to a fitting. As here embodied, a bell or socket 50 is formed at the end of a pipe 52 by conventional means, such as by insertion of a forming plug (not shown) into the end thereof. An easily molded annular filler ring 54 is then inserted into the enlarged bell or socket 50 until a forced contact with the socket end wall 56 is effected. The annular filler ring 54 is formed with a greatly axially projecting lip 58 which is spaced radially inwardly from the radially outer surface 60 of the filler ring. An annular elastomeric seal ring 62 is then inserted within the socket 50 and a retaining ring 64 having a generally axially projecting lip 66 is inserted into the socket 50 so that the lip 66 contacts the seal ring 62 and forces the seal ring against the lip 58 of the filler ring 54. The end of the socket 50 is then deformed radially inwardly, as shown at 68 to trap the retaining ring 64, the seal ring 62 and the filler ring 64 in position. The design of the filler ring 54 and retaining ring 64 together with the seal ring 62 provide the clearances 70 and 72 which permit the lateral expansion of the seal ring 62 when a mating pipe is inserted within the socket 50.

While the seal ring 62 could be formed with a circular cross-section because of the simplicity and economical advantage in this shape, other cross-sectional shapes, such as the trapezoidal shape shown, could also be used provided that the cross-section dimension of the seal ring at a position above the aligned lips is greater than the spacing between the lips in order to insure trapping the seal ring in place.

The seal ring must be flexible and resilient and may be made out of any suitable elastomeric material which is compatible with the atmosphere in which the pipe is to be used. For example, in normal water and sewage use the sealing ring can be formed of natural or synthetic rubber. The pipe, retaining ring and filler ring may be made of relatively rigid material, for example metal or thermoplastics such as polyvinyl chloride, polypropylene or other similar plastics. If the retaining ring is to be trapped within the socket by deforming such as cold rolling the end of the socket then the material used must be ductil, however, other rigid non-ductil materials can be employed if the retaining ring is to be affixed in the socket by welding or other means.

SUMMARY

As can be seen, an effective reliable pipe joint is provided which can be manufactured and assembled at reduced manufacturing and tooling costs and which is suitable for use both with fittings and pipes to obtain additional economic efficiencies. Furthermore, the joint is particularly suited for use in unclean environments wherein dirt particles commonly appear since the firm and effective contact between the sealing ring and the lips holding the ring in place prevent dirt particles from entering the clearance around the sealing ring and prevent sucn particles from becoming lodged under the sealing ring and causing a leakage path.

What is claimed is:

1. A pipe joint including an annular wall having an inwardly extending shoulder spaced axially from an open end thereof; said annular wall and said shoulder defining a socket, a first lip extending from said shoulder toward said open end and spaced radially from said annular wall; an annular retaining ring wholly within said socket adjacent to said open end and spaced axially from said first lip, a second lip spaced from said first lip extending from said retaining ring toward said first lip; an annular seal ring between and in contact with said first and second lips, the seal ring cross-sectional dimension at the mean diameter of said seal ring being larger than the spacing between said first and second lips and residing radially between said annular wall and said first and second lips; said seal ring, said annular wall, said shoulder and said first lip defining a first clearance and said seal ring, said annular wall, said retaining ring and said second lip defining a second clearance, said first and second clearances permitting said seal ring to be deformed when compressed radially by insertion of a pipe into said socket and in contact with said seal ring, and means within said socket for locking said retaining ring within said annular wall.

2. A pipe joint as defined in claim 1 wherein said seal ring has a circular cross-section and protrudes radially inwardly beyond said retaining ring and said first lip.

3. A pipe joint as defined in claim 1 wherein in said seal ring is elastomeric and said annular wall, said first lip and said retaining ring are relatively rigid.

4. A pipe joint as defined in claim 3 wherein said means for locking said retaining ring within said socket is a third lip extending radially inwardly from said annular wall adjacent to said one end.

5. A pipe fitting comprising a primary fitting having:
   a. an enlarged generally cylindrical socket integrally molded as a part thereof, said socket having an open end to receive a male pipe member and a socket end wall spaced axially from said open end;
   b. a first lip extending generally axially from said socket end wall toward said open end and defining an annular groove between said socket and said first lip, said first lip being molded as an integral part of said socket end wall;
   c. an annular retaining ring wholly within said socket adjacent to said open end and having a second lip extending generally axially toward said first lip and spaced therefrom;
   d. an annular seal ring between and in contact with said first and second lips, the seal ring cross-sectional dimension at the mean diameter of said seal ring being located radially between said socket and said first and second lips, a first clearance being formed between said seal ring and said socket end wall radially outwardly from said first lip and a second clearance being formed between said seal ring and said retaining ring radially outwardly from said second lip; said first and second clearances permitting said seal ring to be deformed when compressed radially by insertion of a pipe into said socket and in contact with said seal ring, and
   e. means within said socket for locking said retaining ring within said socket.

6. A pipe fitting as defined in claim 5 wherein said means for locking said retaining ring is a third lip extending radially inwardly from said open end of said socket.

7. A pipe fitting as defined in claim 5 wherein the exterior surface of said primary fitting is of constant diameter from a position radially aligned with said first lip to said open end.

8. A method of making a pipe joint for a pipe fitting comprising the steps of:
   a. molding said fitting with an enlarged cylindrical socket at an end thereof;
   b. molding an annular groove into an annular end wall of said socket spaced from said end thereby forming a first lip spaced radially inwardly from said socket and axially from said end;
   c. inserting an annular seal ring into said cylindrical socket in contact with said first lip, the mean diameter of said seal ring being located radially outwardly from said first lip;
   d. inserting an annular retaining ring wholly within said socket, said retaining ring having a second lip spaced radially inwardly from the outer surface thereof and extending transversely therefrom so that said second lip contacts said seal ring radially inwardly from said mean diameter of said seal ring; and
   e. locking said retaining ring wholly within said cylindrical socket by means which are located within said socket.

* * * * *